US010901803B2

(12) United States Patent
Duale et al.

(10) Patent No.: US 10,901,803 B2
(45) Date of Patent: Jan. 26, 2021

(54) ALLOCATION OF RESOURCES AMONG LOGICAL PARTITIONS

(71) Applicant: INTERNATIONAL BUSINESS MACHINES CORPORATION, Armonk, NY (US)

(72) Inventors: Ali Y. Duale, Poughkeepsie, NY (US); Paul Wojciak, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 16/104,338

(22) Filed: Aug. 17, 2018

(65) Prior Publication Data
US 2020/0057678 A1 Feb. 20, 2020

(51) Int. Cl.
G06F 9/50 (2006.01)
(52) U.S. Cl.
CPC .................. G06F 9/5077 (2013.01)
(58) Field of Classification Search
None
See application file for complete search history.

(56) References Cited

U.S. PATENT DOCUMENTS

| 7,904,691 | B2 | 3/2011 | Branda et al. | |
| 8,145,872 | B2* | 3/2012 | Shah | G06F 9/5077 711/100 |
| 8,185,907 | B2 | 5/2012 | Gusler et al. | |
| 8,285,966 | B2* | 10/2012 | Shah | G06F 9/5077 711/100 |
| 8,302,102 | B2 | 10/2012 | Anand et al. | |
| 8,387,041 | B2 | 2/2013 | Branda et al. | |
| 8,539,197 | B1 | 9/2013 | Marshall et al. | |
| 8,645,974 | B2 | 2/2014 | Armstrong et al. | |
| 8,850,447 | B2* | 9/2014 | Johnson | G06F 9/5077 718/105 |
| 8,918,561 | B2 | 12/2014 | Hegde et al. | |
| 9,058,218 | B2 | 6/2015 | Barsness et al. | |
| 9,170,903 | B2* | 10/2015 | Duale | G06F 11/0778 |
| 9,286,133 | B2* | 3/2016 | Dusanapudi | G06F 9/5077 |
| 9,298,516 | B2* | 3/2016 | Dusanapudi | G06F 9/5077 |

(Continued)

OTHER PUBLICATIONS

Bhatia, Neeraj, "Capacity Planning and Performance Management on IBM PowerVM Virtualized Environment," Oct. 2011, pp. 1-34.

(Continued)

Primary Examiner — Van H Nguyen
(74) Attorney, Agent, or Firm — Teddi Maranzano, Esq.; Blanche E. Schiller, Esq.; Heslin Rothenberg Farley & Mesiti P.C.

(57) ABSTRACT

A set of test cases is obtained to evaluate the resource configuration of a computing environment. One or more test cases of the set of test cases are randomly selected and sent to one or more logical partitions of the computing environment. Execution of the one or more test cases on the one or more logical partitions is monitored. Based on the monitoring, verify whether processing associated with the one or more logical partitions is being performed at an acceptable level. Based on the verifying indicating that the processing is not at an acceptable level, initiating reconfiguring of resources of at least one logical partition of the one or more logical partitions.

20 Claims, 7 Drawing Sheets

(56) References Cited

U.S. PATENT DOCUMENTS

2015/0095607 A1* 4/2015 Dusanapudi .......... G06F 9/5077
711/173
2016/0232005 A1* 8/2016 Duale .................... G06F 11/26

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.
IBM, "z/Architecture—Principles of Operation," IBM Publication No. SA22-7832-11, Twelfth Edition, Sep. 2017, pp. 1-1902.
Pattipati, Narayana, "SAS Deployment on IBM Power Servers with IBM PowerVM Dedicated-Donating LPARs," Jan. 2013, pp. 1-11 (+ cover).

* cited by examiner

US 10,901,803 B2

ALLOCATION OF RESOURCES AMONG LOGICAL PARTITIONS

BACKGROUND

One or more aspects relate, in general, to processing within a computing environment, and in particular, to facilitating configuration of a computing environment having logical partitions to facilitate processing within the computing environment.

To ensure proper processing within a computing environment, adequate resources are to be available to run workloads that are to be executed within the environment. These resources include processor resources, among others.

In more complex environments, the assignment of resources is more challenging. For instance, in computing environments that support logical partitioning, there may be requirements for shared, as well as dedicated processors, to be assigned to the partitions of the environment.

SUMMARY

Shortcomings of the prior art are overcome and additional advantages are provided through the provision of a computer program product for facilitating configuration of a computing environment. The computer program product includes a computer readable storage medium readable by a processing circuit and storing instructions for performing a method. The method includes obtaining a set of test cases to evaluate resource configuration of the computing environment, the resource configuration including one or more dedicated resources of the computing environment. One or more test cases of the set of test cases are randomly selected and sent to one or more logical partitions of the computing environment to test use by at least one logical partition of the one or more logical partitions of at least one dedicated resource of the one or more dedicated resources. Execution of the one or more test cases on the one or more logical partitions is monitored. Based on the monitoring, verify whether processing associated with the one or more logical partitions is being performed at an acceptable level, wherein the verifying determines, at least, whether use of the at least one dedicated resource by the at least one logical partition is predefined correct behavior. Based on the verifying indicating that the processing is not at an acceptable level, initiating reconfiguring of resources of at least one logical partition of the one or more logical partitions.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a capability is provided to assign resources to one or more logical partitions and to verify the assignment is appropriate in that it meets expected criteria. For example, the verification determines whether the partitions and/or workloads executing on the partitions are functioning as expected. The assignment is evaluated to determine, for instance, whether the partitions and/or applications have been assigned sufficient resources to meet expected demands.

One example of a computing environment to incorporate and use one or more aspects of the present invention is described with reference to FIG. 1. In one example, the computing environment is based on the z/Architecture, offered by International Business Machines Corporation, Armonk, N.Y., aspects of which are described in z/Architecture—Principles of Operation, Publication No. SA22-7832-11, $12^{th}$ edition, September 2017, which is hereby incorporated herein by reference in its entirety. The z/Architecture, however, is only one example architecture. The computing environment may be based on other architectures offered by International Business Machines Corporation or others.

Figure 1:
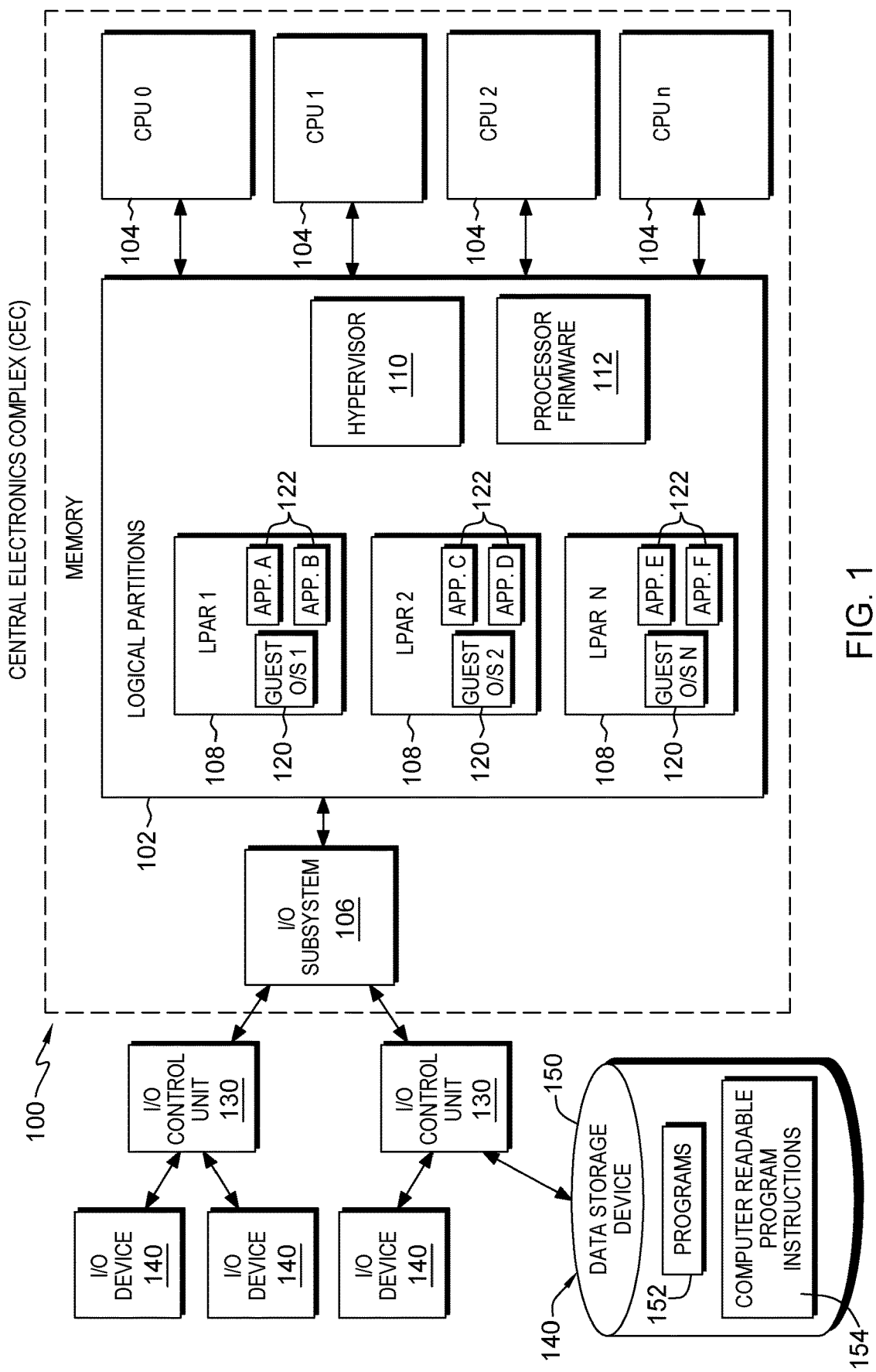
FIG. 1 depicts one example of a computing environment to incorporate and use one or more aspects of the present invention.

Referring to FIG. 1, in one example, the computing environment includes a central electronics complex (CEC) 100. CEC 100 includes a plurality of components, such as, for instance, a memory 102 (a.k.a., system memory, main memory, main storage, central storage, storage) coupled to one or more processors (a.k.a., central processing units (CPUs)) 104, and to an input/output subsystem 106.

Memory 102 includes, for example, one or more logical partitions 108, a hypervisor 110 that manages the logical partitions, and processor firmware 112. One example of hypervisor 110 is the Processor Resource/System Manager (PRISM), offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 108 is capable of functioning as a separate system. That is, each logical partition can be independently reset, run a guest operating system 120 such as z/OS, offered by International Business Machines Corporation, or another operating system, and operate with different programs 122. An operating system or application program running in a logical partition appears to have access to a full and complete system, but in reality, only a portion of it is available.

Memory 102 is coupled to processors (e.g., CPUs) 104, which are physical processor resources that may be allocated to the logical partitions. For instance, a logical partition 108 includes one or more logical processors, each of which represents all or a share of a physical processor resource 104 that may be dynamically allocated to the logical partition.

Further, memory 102 is coupled to I/O subsystem 106. I/O subsystem 106 may be a part of the central electronics complex or separate therefrom. It directs the flow of information between main storage 102 and input/output control units 130 and input/output (I/O) devices 140 coupled to the central electronics complex.

Many types of I/O devices may be used. One particular type is a data storage device 150. Data storage device 150 may store one or more programs 152, one or more computer readable program instructions 154, and/or data, etc. The computer readable program instructions may be configured to carry out functions of embodiments of aspects of the invention.

Central electronics complex 100 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 100. Examples include, but are not limited to: microcode, device drivers, redundant processing units, external disk drive arrays, RAID systems, tape drives, and data archival storage systems, etc.

Further, central electronics complex 100 may be operational with numerous other general purpose or special purpose computing system environments or configurations. Examples of well-known computing systems, environments, and/or configurations that may be suitable for use with central electronics complex 100 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As indicated above, physical processor resources (e.g., CPUs 104) are assigned to logical partitions 108 in order to perform work (e.g., execute applications). In accordance with an aspect of the present invention, resources are assigned to the partitions and tests are performed to determine whether the partitions and/or applications within those partitions are executing as expected. In one example, a testing engine is used to assign the resources, perform the tests and determine whether the partitions and/or applications are executing within acceptable limits, as defined by selected criteria.

Figure 2:
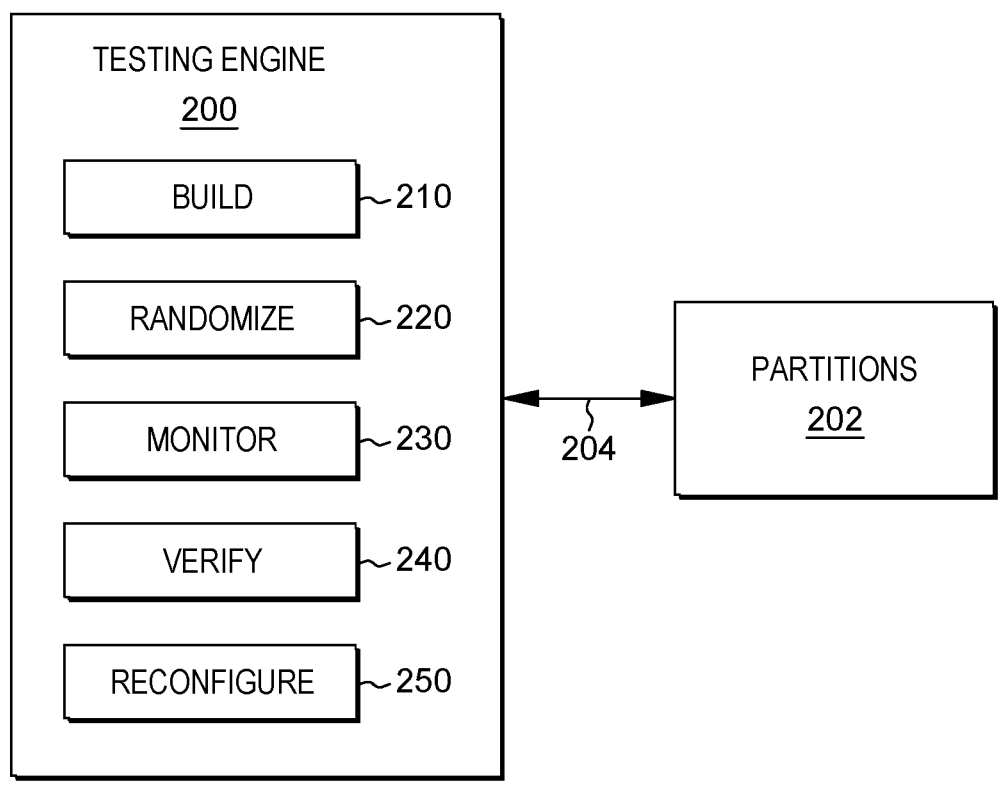
FIG. 2 depicts one example of a testing engine coupled to one or more partitions of the computing environment of FIG. 1 and incorporating one or more aspects of the present invention.

One example of a testing engine is depicted in FIG. 2. As shown, a testing engine 200 is coupled to one or more logical partitions 202 via one or more connections 204. In one example, testing engine 200 is a general-purpose computing device, which, in one example includes, but is not limited to, one or more processors or processing units (e.g., central processing units (CPUs)), a memory (a.k.a., system memory, main memory, main storage, central storage or storage, as examples), and one or more input/output (I/O) interfaces, coupled to one another via one or more buses and/or other connections. A bus represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Testing engine 200 may be, for instance, a personal computer (PC) system, a server computer system, a thin client, a thick client, a handheld or laptop device, a multi-processor system, a microprocessor-based system, a set top box, a programmable consumer electronic, a network PC, a minicomputer system, or a mainframe computer system, as examples. Other examples are also possible.

Partitions 202 include, for instance, a plurality of logical partitions (e.g., logical partitions 108) to which resources are assignable, and one or more connections 204 include any type of suitable connection, such as, but not limited to, a network connection, such as a local area network (LAN), a wide area network (WAN) or a public network (e.g. Internet), as examples. The partitions may be part of a production environment or a test environment. A partition is assigned a set of resources to be used to execute applications. This set of resources includes, for instance, one or more dedicated processors (e.g., specific processors assigned to one or more particular partitions) and/or one or more shared processors.

Testing engine 200 includes a plurality of components to perform one or more aspects of the present invention. For instance, the plurality of components include a build component 210 to build test cases, a randomize component 220 to randomly select and send the selected test cases to one or more selected partitions, a monitor component 230 to monitor execution of the test cases, a verify component 240 to verify the test cases, and a reconfigure component 250 to at least initiate reconfiguration of assignment of the resources. More, fewer and/or different components may be used.

Figure 3:
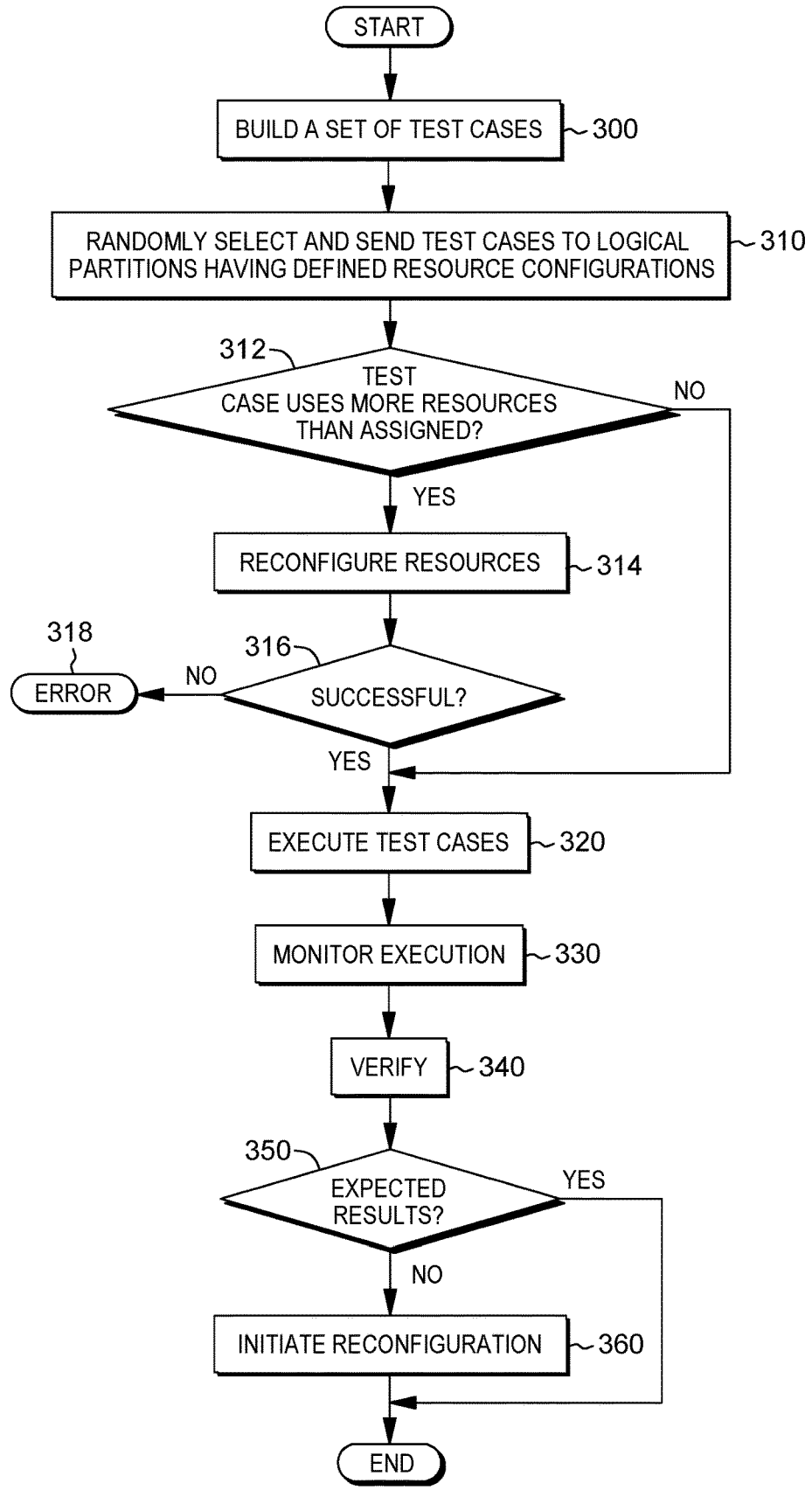
FIG. 3 depicts one example of logic to assign resources and perform verification of such an assignment, in accordance with one or more aspects of the present invention.

One example of using the components to automatically select and use test cases to verify an assignment of resources is described with reference to FIG. 3. Initially, in one example, a set of test cases is built using, e.g., build component 210, STEP 300. The test cases include applications that use different groupings of resources, such as processors. For instance, one test case uses a number of dedicated processors; another test case uses a number of shared processors; and a further test case uses one or more dedicated processors and one or more shared processors. For one or more of the test cases, one or more dedicated processors are to be transferred from one partition to another partition. Other tests may also be performed.

One or more of the built test cases are chosen and forwarded to one or more partitions, STEP 310. As an example, test cases are randomly selected (e.g., via randomize component 220 using any type of randomizing function; e.g., round robin; based on a random number selection; any other type of randomization) and automatically sent to one or more selected partitions. The selected partitions have defined resource configurations (e.g., defined number of dedicated and/or shared processors) and may be selected based on the defined configuration; randomly; in a preset order; and/or by any other mechanism.

In one example, for each logical partition receiving one or more test cases, a determination is made as to whether any of the test cases is to use more resources (e.g., dedicated processors) than assigned to the logical partition to execute the test case, INQUIRY 312. If so, then reconfiguration is initiated, STEP 314. The initiating reconfiguration includes, for instance, requesting resources from another logical partition and/or re-assigning the resources. The determination and/or the initiating reconfiguration are performed, via, e.g., randomize component 220 or another component of testing engine 220—the other component being one of the components shown in FIG. 2 or another component not shown; or they may be via the logical partition (e.g., hypervisor) receiving the test case, as examples. If the reconfiguration is not successful, INQUIRY 316, then an error is provided, STEP 318. Otherwise, if the reconfiguration is successful or if none of the test cases use more resources than assigned, processing continues with executing the test cases.

Each partition that receives one or more test cases executes the received test cases, STEP 320. For example, if a partition receives a test case that includes one or more multi-processor applications to run on N (e.g., 4) dedicated processors, then the partition runs the multi-processor applications on the N dedicated processors.

Execution of the test cases is monitored (via, e.g., monitor component 230) on one or more of the partitions to determine whether the partitions being monitored or applications executing thereon are performing as expected, STEP 330. For instance, monitoring is performed to determine whether use of dedicated processors is correct behavior, as predefined. As an example, is a set of processors marked as dedicated available for only one partition at any given time (although dedicated processors may be shared, at any one time, they are available to only one partition)? As another example, a set of performance criteria is monitored including, for instance, CPU cycles, CPU time slices, processing time, and/or processing speed, etc. Many types of performance criteria may be used.

Based on the monitoring, verification is performed (e.g., via verify component 240) to determine whether the partitions and/or applications are running as expected (e.g., within certain tolerances), STEP 340. As examples, a determination is made as to whether each monitored partition is running at expected speed; is being starved for processing time; is using too many CPU cycles or time slices; and/or whether dedicated resources (e.g., dedicated processors) are being used correctly, etc. For instance, assume two logical partitions, each being assigned two dedicated processors. Further, assume that Partition 1 is running an Application 1 that requires four dedicated processors. Thus, Partition 1 borrows two dedicated processors from Partition 2. Verification determines, for instance, that Application 1 received the four dedicated processors, and that Partition 2 is not using any of the four dedicated processors. As another particular example, verification may determine whether Application 1 is using an expected number of time slices. For instance, if Application 1 typically uses X number of times slices to run a workload, and monitoring indicates it is using more than expected or over a defined threshold (e.g., Application 1 is using 2× time slices), then verification indicates unexpected results or an error. Many examples and variations are possible.

Verification may also determine, based on Application 2 starting on Partition 2, whether the resources are available. For instance, has Application 2, which requires, e.g., 2 dedicated processors, started while Application 1 is still running. If so, then that is incorrect behavior, since there are no dedicated processors for Application 2. However, if Application 2 starts only after Application 1 has ended, then that would indicate normal behavior. Many other examples are possible.

If verification determines that a partition and/or an application is not running as expected, INQUIRY 350, then an indication of such is provided, e.g., from verify component 240 to reconfigure component 250. Reconfiguration is initiated (e.g., via reconfigure component 250), STEP 360. This may include many types of tasks. As examples, initiating reconfiguration, based on the testing indicating unexpected results, includes indicating an error (e.g., automatically) to, e.g., the testing engine (and/or to another entity) to allow the testing engine to provide status, determine correctness of the results, confirm correctness of the expectation, collect data, and/or initiate changes in the configuration; automatically informing the hypervisor (or another entity) of the results of verification, such that the hypervisor takes action, if need be, including, e.g., reconfiguring allocation of the resources; commencing reconfiguration of the environment, including re-assigning processors; shifting workloads, etc.; and/or reconfiguring the environment. In a further example, the initiating reconfiguring includes automatically re-trying one or more test cases. For instance, if verification determines that a processor is not making forward progress, is using more than its allocated time slices, or the job duration exceeds a predefined threshold, as examples, a reconfiguration request could be initiated that automatically retries the test case (or builds/uses one or more other test cases). The monitoring and verification are performed again to determine, e.g., whether the system automatically responded and recovered from the error (e.g., reconfigured resources). After some number of retries, if the misbehavior is not overcome, then an error is provided, e.g., to the testing engine or another component. This error may include status and/or data collected from running the test case one or more times. Many possibilities exist.

If verification is successful, then, in one example, processing is complete. However, in other embodiments, status is provided to an entity (e.g., the testing engine, hypervisor or other entity), such that performance decisions can be made with respect to the environment. Other variations are possible.

Figure 4:
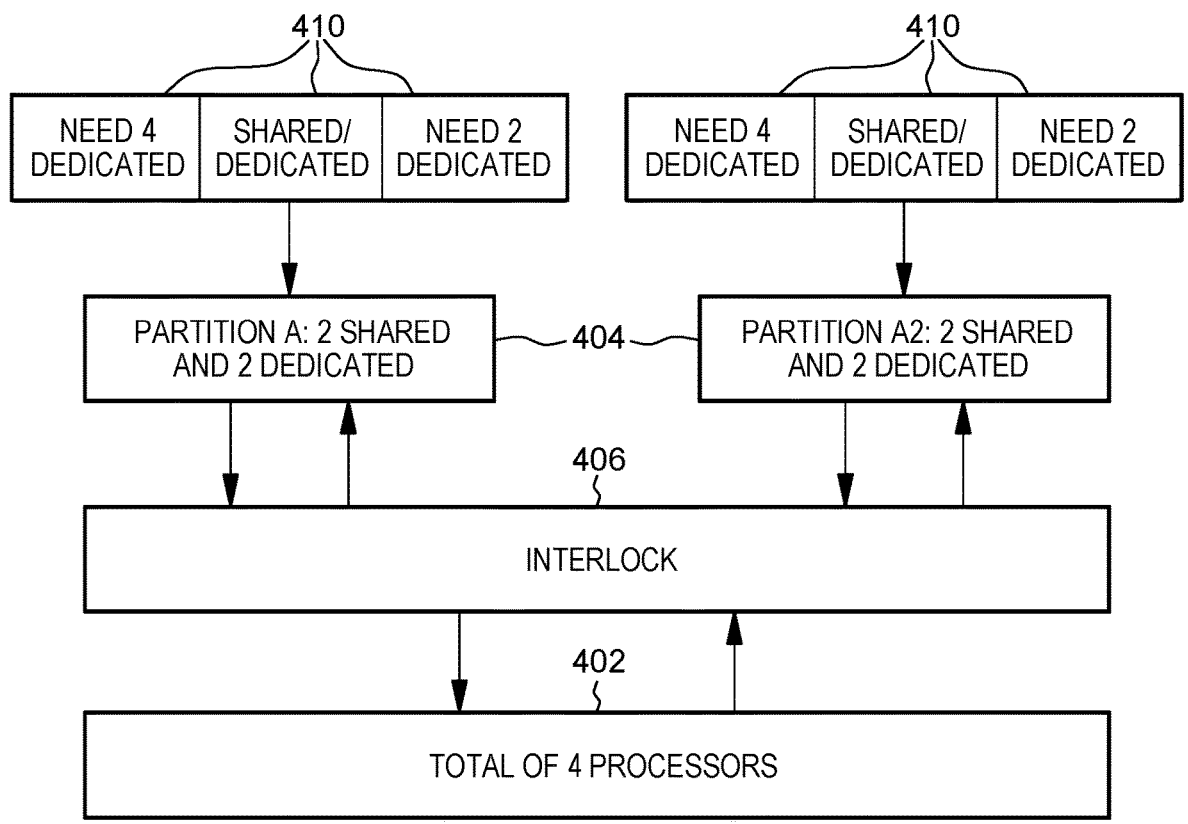
FIG. 4 depicts one example of testing the assignment of resources, in accordance with one or more aspects of the present invention.

Further details of one particular example of executing test cases in a computing environment are described with reference to FIG. 4. In this particular example, a computing environment 400 includes a plurality of processors (e.g., 4) 402 assignable to a plurality of partitions 404 by an interlock 406, such as a hypervisor. In this particular example, which is simply for illustration purposes, there are two logical partitions 404: Partition A and Partition A2. In other examples, there may be more than two partitions and/or more or fewer than 4 processors.

In this example, each partition initially has two shared and two dedicated processors; however, other examples are possible. A dedicated processor has a direct logical processor to physical processor mapping, in which a particular processor is to be used by one or more particular partitions.

In accordance with an aspect of the present invention, one or more test cases randomly selected from a plurality of test cases 410 are sent to one or more partitions for execution. One of the test cases includes applications to run on four dedicated processors, another includes applications to run on either shared or dedicated processors, and another test case includes applications to run on two dedicated processors. Many examples are possible.

In the test case using four dedicated processors, two dedicated processors are transferred from another partition, since each partition, in this example, only has two dedicated processors. Thus, this test case tests, for instance, whether the partition whose dedicated processors where lent to other partitions is running on dedicated processors. If so, an error is indicated.

Each randomly selected test case sent to a partition is executed and execution is monitored. For instance, a set of selected criteria is monitored, such as, e.g., processor speed in performing the applications, CPU cycles or time slices used, etc. The values obtained from monitoring are compared to expected values or ranges of values. As an example, the expected results may be collected by running the test cases on an environment in which there is no contention for the dedicated processors (e.g., the dedicated processors are not shared and not transferred from one partition to another). If the monitored values meet the expected values or ranges, then the verification is successful. Otherwise, reconfiguration is initiated. This includes, as examples, indicating an error to the testing engine or other entity, repeating the testing, informing the interlock that the assignment is not satisfactory, and/or changing the reconfiguration (e.g., re-assigning resources, such as processors), etc.

One or more aspects of the present invention are inextricably tied to computer technology and facilitate processing within a computer, improving performance thereof. The assignment of shared resources (e.g., shared dedicated processors) within a logically partitioned environment by, e.g., a hypervisor or other interlock, is evaluated to determine whether the interlock is functioning properly and to determine whether processing within the environment is performing as expected. Based on this evaluation, the environment may be reconfigured to enable proper functioning and/or improve system performance within the environment.

In one or more aspects, resources, such as processor resources, including dedicated processor resources, are randomly assigned to one or more partitions. The assignment is then evaluated and verified to determine whether the partitions and/or applications running within the partitions are executing as expected. As an example, resource consumption is monitored to verify that applications executing on different partitions and requiring the same dedicated resources, where none of the partitions has sufficient dedicated resources (e.g., each partition is to borrow dedicated resources of one or more other partitions) are not running at the same time, and that each is making forward progress. If not, automatic reconfiguring is initiated, which includes, as examples, reporting an error and/or re-assigning the resources, at least temporarily. Further, verification is performed to determine whether applications not requiring dedicated resources run at a normal (as defined) speed.

In one or more aspects, the assignment of a system's resources, including processors with dual-purpose functions, such as shared and dedicated processors, is automatically tested, verified and optionally, correction is, at least, initiated, if the verification is unsuccessful. As an example, the assignment and management of dedicated processors that can be shared via interlock operations between the hypervisor and logical partitions are tested, verified and optionally, corrected. The testing and verifying are performed, in one example, automatically (e.g., without manual intervention) to save time, cover more types of conditions (e.g., processor race conditions) and/or improve performance.

Further, in one example, the initiating of correction and/or the correcting are performed automatically (e.g., without manual intervention).

Other variations and embodiments are possible.

Figure 5A:
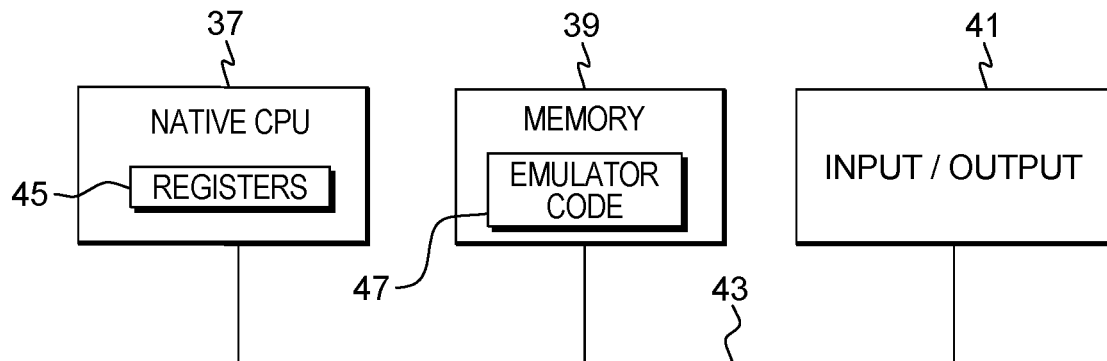
FIG. 5A depicts another example of a computing environment to incorporate and use one or more aspects of the present invention.

Other types of computing environments may also incorporate and use one or more aspects of the present invention, including, but not limited to, emulation environments, an example of which is described with reference to FIG. 5A. In this example, a computing environment 35 includes, for instance, a native central processing unit (CPU) 37, a memory 39, and one or more input/output devices and/or interfaces 41 coupled to one another via, for example, one or more buses 43 and/or other connections. As examples, computing environment 35 may include a PowerPC processor offered by International Business Machines Corporation, Armonk, N.Y.; and/or other machines based on architectures offered by International Business Machines Corporation, Intel, or other companies.

Native central processing unit 37 includes one or more native registers 45, such as one or more general purpose registers and/or one or more special purpose registers used during processing within the environment. These registers include information that represents the state of the environment at any particular point in time.

Moreover, native central processing unit 37 executes instructions and code that are stored in memory 39. In one particular example, the central processing unit executes emulator code 47 stored in memory 39. This code enables the computing environment configured in one architecture to emulate another architecture. For instance, emulator code 47 allows machines based on architectures other than the z/Architecture, such as PowerPC processors, or other servers or processors, to emulate the z/Architecture and to execute software and instructions developed based on the z/Architecture.

Figure 5B:
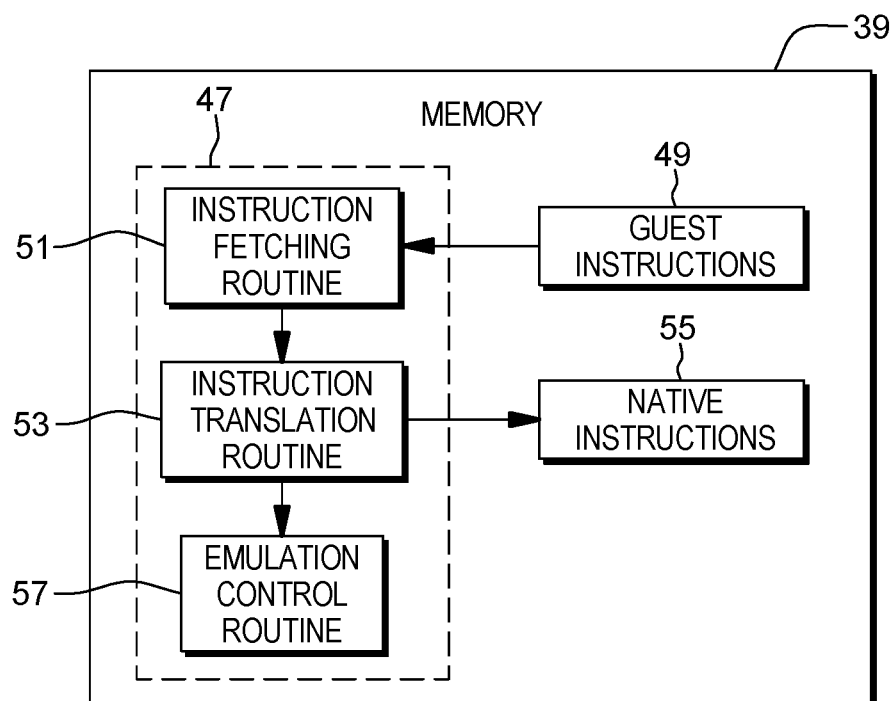
FIG. 5B depicts further details of the memory of FIG. 5A.

Further details relating to emulator code 47 are described with reference to FIG. 5B. Guest instructions 49 stored in memory 39 comprise software instructions (e.g., correlating to machine instructions) that were developed to be executed in an architecture other than that of native CPU 37. For example, guest instructions 49 may have been designed to execute on a z/Architecture processor, but instead, are being emulated on native CPU 37, which may be, for example, an Intel processor. In one example, emulator code 47 includes an instruction fetching routine 51 to obtain one or more guest instructions 49 from memory 39, and to optionally provide local buffering for the instructions obtained. It also includes an instruction translation routine 53 to determine the type of guest instruction that has been obtained and to translate the guest instruction into one or more corresponding native instructions 55. This translation includes, for instance, identifying the function to be performed by the guest instruction and choosing the native instruction(s) to perform that function.

Further, emulator code 47 includes an emulation control routine 57 to cause the native instructions to be executed. Emulation control routine 57 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 55 may include loading data into a register from memory 39; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 45 of the native CPU or by using locations in memory 39. In embodiments, guest instructions 49, native instructions 55 and emulator code 37 may reside in the same memory or may be disbursed among different memory devices.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
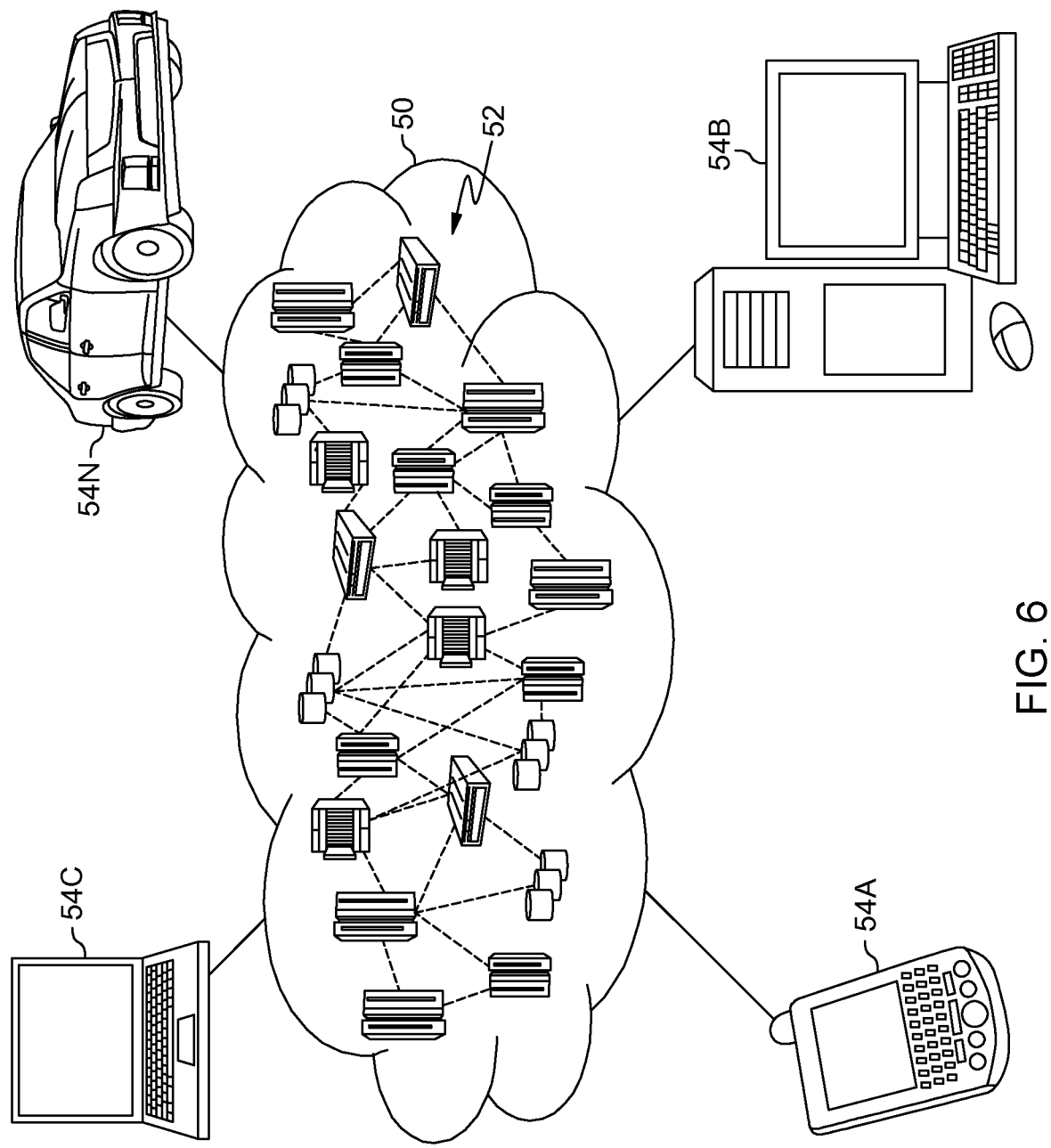
FIG. 6 depicts one embodiment of a cloud computing environment.

Referring now to FIG. 6, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 52 and cloud computing environment 50 can communicate with any type of computerized device over any type of network and/or network addressable connection (e.g., using a web browser).

Figure 7:
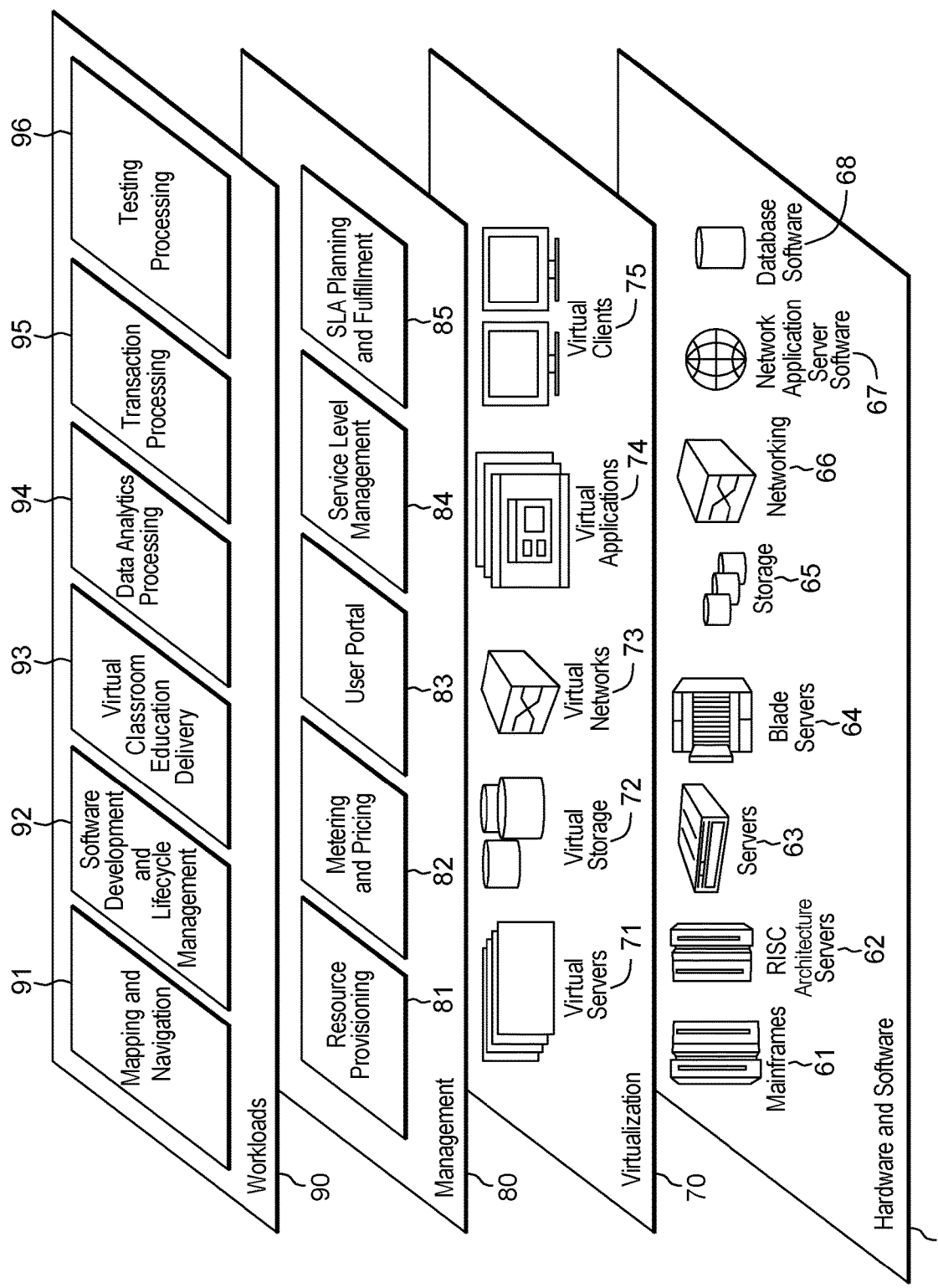
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and testing processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Other types of partitions may benefit from one or more aspects of the present invention. Additionally, other types of selection criteria for the test cases and/or partitions may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating configuration of a computing environment, the computer program product comprising:
   a computer readable storage medium readable by a processing circuit and storing instructions for performing a method comprising:
      obtaining a set of test cases to evaluate resource configuration of the computing environment, the resource configuration comprising one or more dedicated resources of the computing environment, and wherein a test case of the set of test cases is to use more resources than configured for a particular logical partition of the computing environment;
randomly selecting and sending one or more test cases of the set of test cases to one or more logical partitions of the computing environment to test use by at least one logical partition of the one or more logical partitions of at least one dedicated resource of the one or more dedicated resources;
monitoring execution of the one or more test cases on the one or more logical partitions;
verifying, based on the monitoring, that processing associated with the one or more logical partitions is being performed at an acceptable level, wherein the verifying determines, at least, whether use of the at least one dedicated resource by the at least one logical partition is predefined correct behavior; and
initiating reconfiguring of resources of at least one logical partition of the one or more logical partitions based on the verifying indicating that the processing is not at an acceptable level.

2. The computer program product of claim 1, wherein the test case of the set of test cases is to use more dedicated resources than configured for the particular logical partition.

3. The computer program product of claim 2, wherein the randomly selecting and sending selects and sends the test case to the particular logical partition, and wherein the method further comprises:
determining that the particular logical partition has insufficient dedicated resources; and
reconfiguring resources of the particular logical partition, based on determining the particular logical partition has insufficient dedicated resources, the reconfiguring borrowing one or more dedicated resources from another logical partition of the computing environment to be used by the particular logical partition.

4. The computer program product of claim 3, wherein the one or more dedicated resources are dedicated processor resources.

5. The computer program product of claim 1, wherein the initiating reconfiguring comprises indicating at least a temporary transfer of processor resources from one logical partition to another logical partition of the computing environment.

6. The computer program product of claim 1, wherein the verifying comprises determining whether one or more applications executing on a logical partition of the one or more logical partitions are running at an expected speed.

7. The computer program product of claim 1, wherein the verifying comprises determining whether one or more applications executing on a logical partition of the one or more logical partitions are making forward progress.

8. The computer program product of claim 1, wherein the verifying comprises:
determining whether multiple applications running on multiple logical partitions of the computing environment are requesting use of one or more of the same dedicated resources; and
initiating reconfiguring of resources of at least one logical partition based on determining that the multiple applications are requesting use of one or more of the same dedicated resources.

9. The computer program product of claim 8, wherein the same dedicated resources are dedicated processor resources.

10. The computer program product of claim 1, wherein the set of test cases includes a plurality of test cases having different processor type requirements, wherein at least one test case of the plurality of test cases comprises use of a select number of dedicated processors, the select number being greater than a number of dedicated processors assigned to a logical partition, and another test case of the plurality of test cases uses one or more dedicated processors and one or more shared processors.

11. A computer system for facilitating configuration of a computing environment, the computer system comprising:
a memory; and
a processor in communication with the memory, wherein the computer system is configured to perform a method, said method comprising:
obtaining a set of test cases to evaluate resource configuration of the computing environment, the resource configuration comprising one or more dedicated resources of the computing environment, and wherein a test case of the set of test cases is to use more resources than configured for a particular logical partition of the computing environment;
randomly selecting and sending one or more test cases of the set of test cases to one or more logical partitions of the computing environment to test use by at least one logical partition of the one or more logical partitions of at least one dedicated resource of the one or more dedicated resources;
monitoring execution of the one or more test cases on the one or more logical partitions;
verifying, based on the monitoring, that processing associated with the one or more logical partitions is being performed at an acceptable level, wherein the verifying determines, at least, whether use of the at least one dedicated resource by the at least one logical partition is predefined correct behavior; and
initiating reconfiguring of resources of at least one logical partition of the one or more logical partitions based on the verifying indicating that the processing is not at an acceptable level.

12. The computer system of claim 11, wherein the test case of the set of test cases is to use more dedicated resources than configured for the particular logical partition.

13. The computer system of claim 12, wherein the randomly selecting and sending selects and sends the test case to the particular logical partition, and wherein the method further comprises:
determining that the particular logical partition has insufficient dedicated resources; and
reconfiguring resources of the particular logical partition, based on determining the particular logical partition has insufficient dedicated resources, the reconfiguring borrowing one or more dedicated resources from another logical partition of the computing environment to be used by the particular logical partition.

14. The computer system of claim 11, wherein the verifying comprises:
determining whether multiple applications running on multiple logical partitions of the computing environment are requesting use of one or more of the same dedicated resources; and
initiating reconfiguring of resources of at least one logical partition based on determining that the multiple applications are requesting use of one or more of the same dedicated resources.

15. The computer system of claim 11, wherein the set of test cases includes a plurality of test cases having different processor type requirements, wherein at least one test case of the plurality of test cases comprises use of a select number of dedicated processors, the select number being greater than a number of dedicated processors assigned to a logical partition, and another test case of the plurality of test cases uses one or more dedicated processors and one or more shared processors.

16. A computer-implemented method of facilitating configuration of a computing environment, the computer-implemented method comprising:

obtaining, by a processor, a set of test cases to evaluate resource configuration of the computing environment, the resource configuration comprising one or more dedicated resources of the computing environment, and wherein a test case of the set of test cases is to use more resources than configured for a particular logical partition of the computing environment;

randomly selecting and sending one or more test cases of the set of test cases to one or more logical partitions of the computing environment to test use by at least one logical partition of the one or more logical partitions of at least one dedicated resource of the one or more dedicated resources;

monitoring execution of the one or more test cases on the one or more logical partitions;

verifying, based on the monitoring, that processing associated with the one or more logical partitions is being performed at an acceptable level, wherein the verifying determines, at least, whether use of the at least one dedicated resource by the at least one logical partition is predefined correct behavior; and initiating reconfiguring of resources of at least one logical partition of the one or more logical partitions based on the verifying indicating that the processing is not at an acceptable level.

17. The computer-implemented method of claim 16, wherein the test case of the set of test cases is to use more dedicated resources than configured for the particular logical partition.

18. The computer-implemented method of claim 17, wherein the randomly selecting and sending selects and sends the test case to the particular logical partition, and wherein the method further comprises:

determining that the particular logical partition has insufficient dedicated resources; and reconfiguring resources of the particular logical partition, based on determining the particular logical partition has insufficient dedicated resources, the reconfiguring borrowing one or more dedicated resources from another logical partition of the computing environment to be used by the particular logical partition.

19. The computer-implemented method of claim 16, wherein the verifying comprises:

determining whether multiple applications running on multiple logical partitions of the computing environment are requesting use of one or more of the same dedicated resources; and initiating reconfiguring of resources of at least one logical partition based on determining that the multiple applications are requesting use of one or more of the same dedicated resources.

20. The computer-implemented method of claim 16, wherein the set of test cases includes a plurality of test cases having different processor type requirements, wherein at least one test case of the plurality of test cases comprises use of a select number of dedicated processors, the select number being greater than a number of dedicated processors assigned to a logical partition, and another test case of the plurality of test cases uses one or more dedicated processors and one or more shared processors.

* * * * *